(12) United States Patent
Döbler et al.

(10) Patent No.: US 8,101,265 B2
(45) Date of Patent: Jan. 24, 2012

(54) COMBINATION INSTRUMENT

(75) Inventors: Michael Döbler, Seligenstadt (DE);
Peter Lehnert, Inning am Ammersee (DE); Joachim Müller, Offenbach (DE); Wolfgang-Peter Pawusch, München (DE); Peter Radojkovic, München (DE); Markus Weber, Mainz (DE)

(73) Assignee: Continental Automotive GmbH, Hannover (DE)

( * ) Notice: Subject to any disclaimer, the term of this patent is extended or adjusted under 35 U.S.C. 154(b) by 309 days.

(21) Appl. No.: 12/600,353

(22) PCT Filed: May 2, 2008

(86) PCT No.: PCT/EP2008/055407
§ 371 (c)(1),
(2), (4) Date: Nov. 16, 2009

(87) PCT Pub. No.: WO2008/138774
PCT Pub. Date: Nov. 20, 2008

(65) Prior Publication Data
US 2010/0182685 A1    Jul. 22, 2010

(30) Foreign Application Priority Data

May 16, 2007 (DE) .......................... 10 2007 023 066

(51) Int. Cl.
*B41M 5/00* (2006.01)
*B44C 1/17* (2006.01)
*G03G 7/00* (2006.01)

(52) U.S. Cl. .................. 428/195.1; 428/201; 428/207; 428/412; 428/500

(58) Field of Classification Search ............... 428/195.1, 428/201, 207, 412, 500
See application file for complete search history.

(56) References Cited

U.S. PATENT DOCUMENTS

| | | | |
|---|---|---|---|
| 4,207,768 A * | 6/1980 | Henss | ............................ 73/431 |
| 4,515,442 A | 5/1985 | Aron | |
| 6,069,737 A | 5/2000 | Fetzer et al. | |
| 6,370,019 B1 | 4/2002 | Matthies et al. | |
| 6,422,710 B1 * | 7/2002 | Herzog et al. | ................... 362/23 |
| 6,750,832 B1 | 6/2004 | Kleinschmidt | |
| 2003/0048194 A1 | 3/2003 | Wada | |
| 2004/0027041 A1 | 2/2004 | Nishikawa | |
| 2006/0034092 A1 * | 2/2006 | Okazaki et al. | ............... 362/489 |
| 2006/0284586 A1 * | 12/2006 | Hagberg et al. | ............... 318/567 |
| 2007/0227795 A1 | 10/2007 | Dorn et al. | |
| 2010/0182685 A1 * | 7/2010 | Dobler et al. | ................. 359/437 |
| 2010/0191419 A1 * | 7/2010 | Habeney | ........................ 701/36 |

FOREIGN PATENT DOCUMENTS

DE    699 32 232 T2    6/2007

* cited by examiner

*Primary Examiner* — Betelhem Shewareged
(74) *Attorney, Agent, or Firm* — Cozen O'Connor

(57) ABSTRACT

A combination instrument has a disk that is transparent for light in the visible range and that has a dial region and an indicator region. It further has a dial imprint, which is applied to the back of the transparent disk in the dial region. In addition, a polarizing filter disk is provided, which is disposed on the back of the transparent disk aligned with the indicator region and comprises a circular polarizing filter. An optical indicator unit is provided, which is disposed in alignment with the indicator region on the back of the transparent disk and the polarizing filter disk.

15 Claims, 2 Drawing Sheets

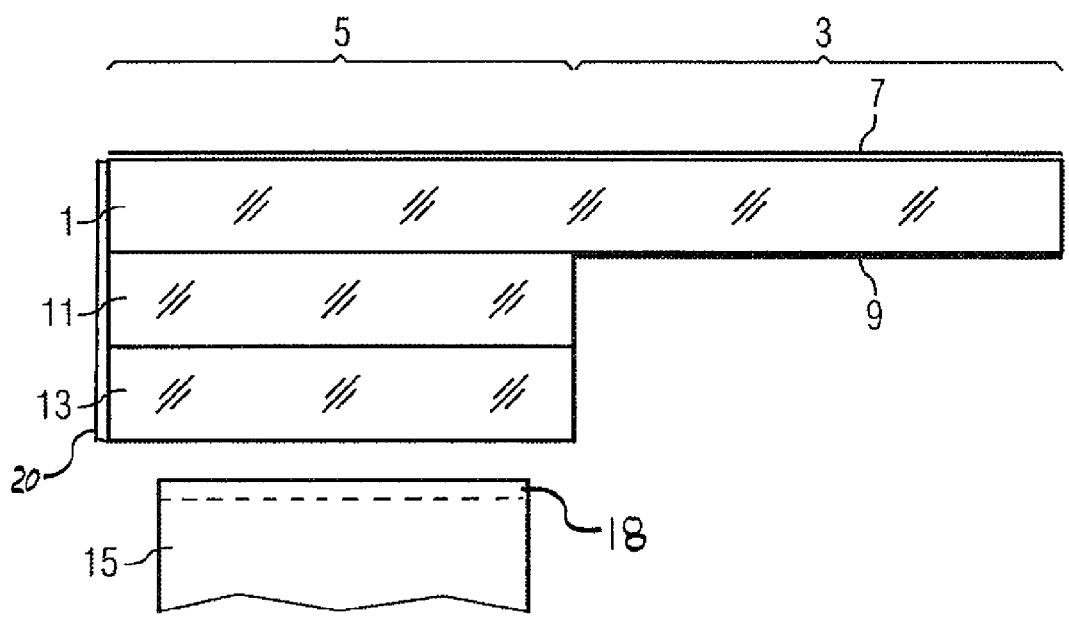

COMBINATION INSTRUMENT

PRIORTY CLAIM

This is a U.S. national stage of application No. PCT/EP2008/055407, filed on May 2, 2008, which claims Priority to the German Application No.: 10 2007 023 066.6, filed: May 16, 2007; the contents of both being incorporated herein by reference.

BACKGROUND OF THE INVENTION

1. Field of the Invention

The invention relates to a combination instrument that can be used, for example, in a motor vehicle.

2. Prior Art

Combination instruments are used to indicate the speed and/or the engine speed of a vehicle. In addition to this function, they are frequently designed to indicate various operating states of the vehicle. For example, they frequently include an indicator signaling that the seatbelt is put on, a display of the state of a handbrake, an airbag monitoring indicator, an ABS or EPS function indicator or else a monitoring indicator or a full beam headlight signal or a dipped headlight signal, a flashing indicator light indicator, a gear speed indicator, or a shift position indicator of an automatic transmission control. In addition, further information can generally be displayed on the combination instrument. Such information may be, for example, the possible distance traveled with a tank of fuel, a current or average fuel consumption, a daily kilometer counter or some other kilometer counter, or further information which is preferably conditioned in a computer unit and output visually by indicator unit arranged in the combination instrument. The indicator unit may be embodied, for example, as a small flat screen and therefore in particular as an LCD.

SUMMARY OF THE INVENTION

An object of the invention is to provide a combination instrument with a visual indicator unit in which, of the visual indicator unit, essentially only the information displayed by the visual indicator unit, but not the indicator unit itself, can be seen.

According to one embodiment of the invention, a combination instrument has a disk which is transparent to light in the visible range, a dial region and an indicator region. A dial imprint is applied to the back of the transparent disk in the dial region. A polarizing filter disk is provided that is arranged on the back of the transparent disk flush with the indicator region that comprises a circular polarizing filter. A visual indicator unit is arranged flush with the indicator region, on the back of the transparent disk and of the polarizing filter disk. The polarizing filter disk ensures that very little ambient light penetrates to the visual indicator unit, and also that the light that is reflected by the visual indicator unit is extinguished to a very high degree. The emitted light which is, in particular, polarized by the visual indicator unit is, however, transmitted to a much greater degree through the polarizing filter disk, with the result that essentially only the information which is displayed by the visual indicator unit, but not the indicator unit itself, can be seen. Furthermore, the combination instrument has a homogenous, and therefore attractive surface, by virtue of the provision of the transparent disk for the dial region and for the indicator region.

According to one embodiment, the combination instrument comprises a filter disk arranged between the transparent disk and the polarizing filter disk, flush with the indicator region. The filter disk is preferably colored gray. In this way, a suitably low level of transmission of the ambient light to the visual indicator unit can be reduced further. This then contributes further to ensuring that the visual indicator unit is itself essentially invisible.

In this context it is particularly advantageous if the filter disk is embodied in such a way that it has a transmission factor of 50% to 20%, particularly advantageously of approximately 25%. This then makes it possible to particularly effectively ensure that the indicator unit itself cannot be seen.

According to a further embodiment of the invention, the transparent disk has a demirrored layer on a front side facing away from the back, which is embodied as a matt hard clear varnish layer. This permits undesired reflexes to be particularly effectively avoided.

According to a further embodiment, the transparent disk and the filter disk comprise polycarbonate. In this way, a particularly high level of temperature stability of the combination instrument can be ensured. Owing to the virtually identical thermal expansion behavior or identical thermal expansion behavior of the transparent disk and of the filter disk. As a result, uniform loading of an adhesive layer between the transparent disk and the filter disk can be ensured.

According to a further embodiment, the polarizing filter disk comprises polyvinyl alcohol. This permits a particularly effective polarizing filter to be implemented.

BRIEF DESCRIPTION OF DRAWINGS

Exemplary embodiments of the invention are explained in more detail in the text which follows by means of the schematic drawings, in which:

FIG. 2 is a cross section through a part of the combination instrument.

DETAILED DESCRIPTION OF THE DRAWINGS

Figure 1:
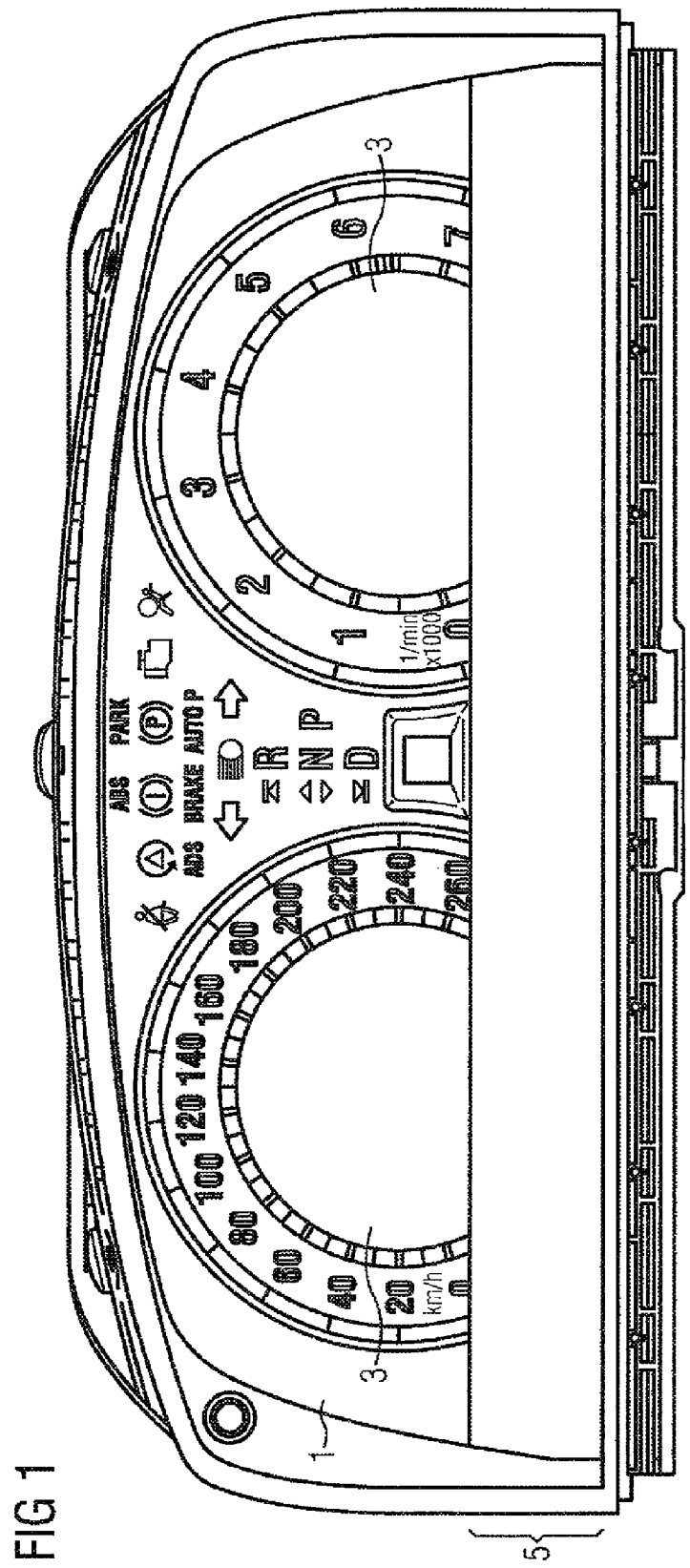
FIG. 1 is a plan view of a combination instrument.

A combination instrument shown in FIG. 1, can be used in a motor vehicle, and is designed to indicate various operating state information items of the vehicle. For example, it comprises a speed indicator and/or an engine speed indicator.

The combination instrument has, on its side facing the driver, a transparent disk 1 for light in the visible range, which transparent disk 1 has a dial region 3 and an indicator region 5. On the side of the transparent disk 1 facing the driver, that is to say the viewer, a demirrored layer 7 is preferably provided. The demirrored layer is preferably matted and preferably has an anti-reflection coating. The demirrored layer 7 is preferably formed from hard clear varnish, which also provides mechanical protection for the combination instrument. The hard clear varnish has a plurality of micro unevennesses that can also be referred to as micro bumps that gives rise to its matted appearance. The surface is therefore diffusely rough. A dial imprint 9 is applied in the dial region 3, on the back of the transparent disk 1, that is to say on the side of the transparent disk 1 facing away from the front side (demirrored layer 7). The dial imprint 9 is preferably essentially black and therefore nontransparent to light. Scales and screen printed elements are also preferably formed in this region.

In the indicator region 5, a filter disk 11, which is colored gray, is arranged on the back of the transparent disk 1, substantially parallel or flush with said indicator region 5. The thickness and the degree of mixing of dark tones is predefined such that a transmission factor of light through the filter disk 11 assumes a predefined value. In this context, the filter disk 11 is preferably embodied in such a way that it has a transmission factor for visible light of approximately 50% to 20%. It has become apparent that a transmission factor of approximately 25% is particularly advantageous.

On the side of the filter disk 11 facing away from the transparent disk 7, a polarizing filter disk 13 is arranged. The polarizing filter disk 13 is also arranged flush with the indicator region 5 with respect to the transparent disk 1. Said polarizing filter 13 disk comprises a circular polarizing filter.

A visual indicator unit 15 is also arranged flush with the indicator region of the transparent disk 1, on the side of the polarizing filter disk 13 facing away from the transparent disk 1. Indicator unit 15 is arranged at a predefined distance from the polarizing filter disk 13. The visual indicator unit 15 can be embodied, for example, as a flat screen and may be, for example, an LCD or a TFT. The indicator unit 15 preferably irradiates polarized light. For this purpose, it can comprise a polarization filter 18 which polarizes, for example, in a linear or circular fashion, preferably polarizes in a circular fashion, the light which is emitted by the indicator unit 15.

The polarization filter 18 is designed to polarize in a circular fashion the light impinging on it so that the light which is polarized in a circular fashion has two oscillation components which are perpendicular to one another and whose propagation direction is perpendicular to a disk plane of the polarization filter disk 13. Said light therefore propagates either directed onto the indicator unit 15 or correspondingly in a reverse direction toward the transparent disk 1. This effect is particularly valuable when there are reflective surfaces since the polarization is maintained. In particular a frame 20 of the indicator unit 15 is frequently embodied as a reflective surface.

The polarizing filter disk 13 ensures that only a small proportion of the ambient light that penetrates from the front side of the transparent disk I is transmitted, and a high proportion of that proportion which is then transmitted with circular polarization, in the direction of the indicator unit 15 and is reflected at said indicator unit 15 is extinguished by the phase shift that occurs as a result of the reflection. Consequently, from the point of view of the viewer the indicator unit 15 is largely invisible as long as said indicator unit 15 does not emit any light itself.

In contrast, due to an orientation of the polarizing filter disk 13, light emitted by the indicator unit 15 can pass relatively unimpeded through the polarization filter (13,18) and therefore, given a suitable selection of the light intensity, also emerge from the transparent disk 1 with a predefined light intensity, necessary for good visibility, and can therefore be clearly visible to the viewer.

The transparent disk 1, the filter disk 11 and the polarizing filter disk 13 are preferably connected to one another by lamination. It is particularly advantageous if the polarizing filter disk 13 and the filter disk 11 are laminated as one unit, that is to say are already laminated, to the transparent disk 1.

Particularly good temperature stability is obtained if the individual disks, that is to say the transparent disk 1, the filter disk 11 and also the polarizing filter disk 13, all comprise polycarbonate. The disks are embodied in particular in the form of films.

As a result of the provision of the transparent disk 1 and of the polarizing filter disk 13, and also preferably of the filter disk 11, a very homogenous surface impression for the viewer in respect of the dial region 3 and the indicator region 3 can be ensured, and therefore stringent design requirements can be allowed for.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A combination instrument comprising:
    a transparent disk that is transparent to light in a visible range having a viewing side and a back side opposite the viewing side, the disk comprising:
        a dial region; and
        an indicator region,
    a dial imprint applied to the back side of the transparent disk in the dial region;
    a polarizing filter disk arranged on the back side of the transparent disk flush with the indicator region, the polarizing filter disk comprising a circular polarizing filter; and
    a visual indicator unit arranged proximate to the indicator region, on a side of the polarizing filter disk opposite the transparent disk.

2. The combination instrument as claimed in claim 1, further comprising:
    a filter disk arranged between the transparent disk and the polarizing filter disk flush with the indicator region.

3. The combination instrument as claimed in claim 2, wherein the filter disk has a transmission factor for visible light of substantially between 50% and 20%, inclusive.

4. The method as claimed in claim 3, wherein the filter disk has a transmission factor for visible light of 25%.

5. The combination instrument as claimed in claim 1, wherein the transparent disk has a demirrored layer arranged on the viewing side.

6. The combination instrument as claimed in claim 5, wherein the demirrored layer is a matte, hard, clear varnish layer.

7. The combination instrument as claimed in claim 2, wherein the transparent disk and the filter disk comprise polycarbonate.

8. The combination instrument as claimed in claim 2, wherein the polarizing filter disk comprises polyvinyl alcohol.

9. The combination instrument as claimed in claim 1, wherein the filter disk is colored gray.

10. The combination instrument as claimed in claim 1, wherein the visual indicator unit further comprises a polarization filter.

11. The combination instrument as claimed in claim 1, wherein the polarizing filter disk is a film.

12. The combination instrument as claimed in claim 2, wherein the filter disk is a film.

13. The combination instrument as claimed in claim 2, wherein the transparent disk has a demirrored layer arranged on the viewing side.

14. The combination instrument as claimed in claim 1, wherein the transparent disk, the polarizing filter, and the visual indicator unit are substantially parallel to one another.

15. The combination instrument as claimed in claim 1, wherein the visual indicator comprises a flat screen.

* * * * *